US011650400B2

(12) United States Patent
Bachar et al.

(10) Patent No.: US 11,650,400 B2
(45) Date of Patent: May 16, 2023

(54) ROTATIONAL BALL-GUIDED VOICE COIL MOTOR

(71) Applicant: Corephotonics Ltd., Tel-Aviv (IL)

(72) Inventors: Gil Bachar, Tel-Aviv (IL); Itay Jerby, Netanya (IL); Itay Yedid, Karme Yosef (IL)

(73) Assignee: Corephotonics Ltd., Tel Aviv (IL)

( * ) Notice: Subject to any disclaimer, the term of this patent is extended or adjusted under 35 U.S.C. 154(b) by 128 days.

(21) Appl. No.: 17/367,382

(22) Filed: Jul. 4, 2021

(65) Prior Publication Data

US 2021/0341713 A1 Nov. 4, 2021

Related U.S. Application Data

(63) Continuation of application No. 16/154,093, filed on Oct. 8, 2018, now Pat. No. 11,150,447, which is a
(Continued)

(51) Int. Cl.
*G02B 13/00* (2006.01)
*G02B 7/00* (2021.01)
(Continued)

(52) U.S. Cl.
CPC ......... *G02B 13/0065* (2013.01); *G02B 7/005* (2013.01); *G02B 7/182* (2013.01);
(Continued)

(58) Field of Classification Search
CPC .. G02B 13/0065; G02B 7/005; G02B 7/1805; G02B 7/182; G02B 27/646;
(Continued)

(56) References Cited

U.S. PATENT DOCUMENTS

| 4,199,785 A | 4/1980 | McCullough et al. |
| 5,005,083 A | 4/1991 | Grage et al. |

(Continued)

FOREIGN PATENT DOCUMENTS

| CN | 101276415 A | 10/2008 |
| CN | 201514511 U | 6/2010 |

(Continued)

OTHER PUBLICATIONS

Statistical Modeling and Performance Characterization of a Real-Time Dual Camera Surveillance System, Greienhagen et al., Publisher: IEEE, 2000, 8 pages.
(Continued)

*Primary Examiner* — Collin X Beatty
*Assistant Examiner* — Grant A Gagnon
(74) *Attorney, Agent, or Firm* — Nathan & Associates; Menachem Nathan

(57) ABSTRACT

Actuators for rotating or tilting an optical element, for example an optical path folding element, comprising a voice coil motor (VCM) and a curved ball-guided mechanism operative to create a rotation or tilt movement of the optical element around a rotation axis upon actuation by the VCM. In some embodiments, an actuator includes two, first and second VCMs, and two curved ball-guided mechanisms operative to create rotation or tilt around respective first and second rotation axes.

20 Claims, 13 Drawing Sheets

Related U.S. Application Data continuation of application No. 15/559,039, filed as application No. PCT/IB2017/052383 on Apr. 25, 2017, now Pat. No. 10,488,631.

(60) Provisional application No. 62/353,278, filed on Jun. 22, 2016, provisional application No. 62/343,011, filed on May 30, 2016.

(51) Int. Cl.
  *H04N 5/232* (2006.01)
  *H04N 5/225* (2006.01)
  *H02K 41/035* (2006.01)
  *G02B 7/18* (2021.01)
  *G02B 7/182* (2021.01)
  *G02B 27/64* (2006.01)

(52) U.S. Cl.
  CPC ......... *G02B 7/1805* (2013.01); *G02B 27/646* (2013.01); *H02K 41/0354* (2013.01); *H04N 5/2254* (2013.01); *H04N 5/2328* (2013.01); *H04N 5/23258* (2013.01); *H04N 5/23296* (2013.01); *H02K 41/0358* (2013.01)

(58) Field of Classification Search
  CPC ........... H02K 41/0354; H02K 41/0358; H04N 5/2254; H04N 5/23258; H04N 5/2328; H04N 5/23296
  USPC ........................................................ 359/822
  See application file for complete search history.

(56) References Cited

U.S. PATENT DOCUMENTS

| | | |
|---|---|---|
| 5,032,917 A | 7/1991 | Aschwanden |
| 5,041,852 A | 8/1991 | Misawa et al. |
| 5,051,830 A | 9/1991 | von Hoessle |
| 5,099,263 A | 3/1992 | Matsumoto et al. |
| 5,248,971 A | 9/1993 | Mandi |
| 5,287,093 A | 2/1994 | Amano et al. |
| 5,394,520 A | 2/1995 | Hall |
| 5,436,660 A | 7/1995 | Sakamoto |
| 5,444,478 A | 8/1995 | Lelong et al. |
| 5,459,520 A | 10/1995 | Sasaki |
| 5,657,402 A | 8/1997 | Bender et al. |
| 5,682,198 A | 10/1997 | Katayama et al. |
| 5,768,443 A | 6/1998 | Michael et al. |
| 5,926,190 A | 7/1999 | Turkowski et al. |
| 5,940,641 A | 8/1999 | McIntyre et al. |
| 5,982,951 A | 11/1999 | Katayama et al. |
| 6,101,334 A | 8/2000 | Fantone |
| 6,128,416 A | 10/2000 | Oura |
| 6,148,120 A | 11/2000 | Sussman |
| 6,208,765 B1 | 3/2001 | Bergen |
| 6,268,611 B1 | 7/2001 | Pettersson et al. |
| 6,549,215 B2 | 4/2003 | Jouppi |
| 6,611,289 B1 | 8/2003 | Yu et al. |
| 6,643,416 B1 | 11/2003 | Daniels et al. |
| 6,650,368 B1 | 11/2003 | Doron |
| 6,680,748 B1 | 1/2004 | Monti |
| 6,714,665 B1 | 3/2004 | Hanna et al. |
| 6,724,421 B1 | 4/2004 | Glatt |
| 6,738,073 B2 | 5/2004 | Park et al. |
| 6,741,250 B1 | 5/2004 | Furlan et al. |
| 6,750,903 B1 | 6/2004 | Miyatake et al. |
| 6,778,207 B1 | 8/2004 | Lee et al. |
| 7,002,583 B2 | 2/2006 | Rabb, III |
| 7,015,954 B1 | 3/2006 | Foote et al. |
| 7,038,716 B2 | 5/2006 | Klein et al. |
| 7,199,348 B2 | 4/2007 | Olsen et al. |
| 7,206,136 B2 | 4/2007 | Labaziewicz et al. |
| 7,248,294 B2 | 7/2007 | Slatter |
| 7,256,944 B2 | 8/2007 | Labaziewicz et al. |
| 7,305,180 B2 | 12/2007 | Labaziewicz et al. |
| 7,339,621 B2 | 3/2008 | Fortier |
| 7,346,217 B1 | 3/2008 | Gold, Jr. |
| 7,365,793 B2 | 4/2008 | Cheatle et al. |
| 7,411,610 B2 | 8/2008 | Doyle |
| 7,424,218 B2 | 9/2008 | Baudisch et al. |
| 7,509,041 B2 | 3/2009 | Hosono |
| 7,533,819 B2 | 5/2009 | Barkan et al. |
| 7,619,683 B2 | 11/2009 | Davis |
| 7,738,016 B2 | 6/2010 | Toyofuku |
| 7,773,121 B1 | 8/2010 | Huntsberger et al. |
| 7,809,256 B2 | 10/2010 | Kuroda et al. |
| 7,880,776 B2 | 2/2011 | LeGall et al. |
| 7,918,398 B2 | 4/2011 | Li et al. |
| 7,964,835 B2 | 6/2011 | Olsen et al. |
| 7,978,239 B2 | 7/2011 | Deever et al. |
| 8,115,825 B2 | 2/2012 | Culbert et al. |
| 8,149,327 B2 | 4/2012 | Lin et al. |
| 8,154,610 B2 | 4/2012 | Jo et al. |
| 8,238,695 B1 | 8/2012 | Davey et al. |
| 8,274,552 B2 | 9/2012 | Dahi et al. |
| 8,390,729 B2 | 3/2013 | Long et al. |
| 8,391,697 B2 | 3/2013 | Cho et al. |
| 8,400,555 B1 | 3/2013 | Georgiev et al. |
| 8,439,265 B2 | 5/2013 | Ferren et al. |
| 8,446,484 B2 | 5/2013 | Muukki et al. |
| 8,483,452 B2 | 7/2013 | Ueda et al. |
| 8,514,491 B2 | 8/2013 | Duparre |
| 8,547,389 B2 | 10/2013 | Hoppe et al. |
| 8,553,106 B2 | 10/2013 | Scarff |
| 8,587,691 B2 | 11/2013 | Takane |
| 8,619,148 B1 | 12/2013 | Watts et al. |
| 8,803,990 B2 | 8/2014 | Smith |
| 8,896,655 B2 | 11/2014 | Mauchly et al. |
| 8,976,255 B2 | 3/2015 | Matsuoto et al. |
| 9,019,387 B2 | 4/2015 | Nakano |
| 9,025,073 B2 | 5/2015 | Attar et al. |
| 9,025,077 B2 | 5/2015 | Attar et al. |
| 9,041,835 B2 | 5/2015 | Honda |
| 9,137,447 B2 | 9/2015 | Shibuno |
| 9,185,291 B1 | 11/2015 | Shabtay et al. |
| 9,215,377 B2 | 12/2015 | Sokeila et al. |
| 9,215,385 B2 | 12/2015 | Luo |
| 9,270,875 B2 | 2/2016 | Brisedoux et al. |
| 9,286,680 B1 | 3/2016 | Jiang et al. |
| 9,344,626 B2 | 5/2016 | Silverstein et al. |
| 9,360,671 B1 | 6/2016 | Zhou |
| 9,369,621 B2 | 6/2016 | Malone et al. |
| 9,413,930 B2 | 8/2016 | Geerds |
| 9,413,984 B2 | 8/2016 | Attar et al. |
| 9,420,180 B2 | 8/2016 | Jin |
| 9,438,792 B2 | 9/2016 | Nakada et al. |
| 9,485,432 B1 | 11/2016 | Medasani et al. |
| 9,578,257 B2 | 2/2017 | Attar et al. |
| 9,618,748 B2 | 4/2017 | Munger et al. |
| 9,681,057 B2 | 6/2017 | Attar et al. |
| 9,723,220 B2 | 8/2017 | Sugie |
| 9,736,365 B2 | 8/2017 | Laroia |
| 9,736,391 B2 | 8/2017 | Du et al. |
| 9,768,310 B2 | 9/2017 | Ahn et al. |
| 9,800,798 B2 | 10/2017 | Ravirala et al. |
| 9,851,803 B2 | 12/2017 | Fisher et al. |
| 9,894,287 B2 | 2/2018 | Qian et al. |
| 9,900,522 B2 | 2/2018 | Lu |
| 9,927,600 B2 | 3/2018 | Goldenberg et al. |
| 2002/0005902 A1 | 1/2002 | Yuen |
| 2002/0030163 A1 | 3/2002 | Zhang |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2003/0030729 A1 | 2/2003 | Prentice et al. |
| 2003/0093805 A1 | 5/2003 | Gin |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |

(56) References Cited

U.S. PATENT DOCUMENTS

| | | |
|---|---|---|
| 2004/0141065 A1 | 7/2004 | Hara et al. |
| 2004/0141086 A1 | 7/2004 | Mihara |
| 2004/0240052 A1 | 12/2004 | Minefuji et al. |
| 2005/0013509 A1 | 1/2005 | Samadani |
| 2005/0046740 A1 | 3/2005 | Davis |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0126911 A1 | 6/2007 | Nanjo |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0196001 A1 | 8/2010 | Ryynanen et al. |
| 2010/0238327 A1 | 9/2010 | Griffith et al. |
| 2010/0259836 A1 | 10/2010 | Kang et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 | 3/2011 | McMordie et al. |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0298966 A1 | 12/2011 | Kirschstein et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0155176 A1 | 6/2013 | Paripally et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-Lacroix |
| 2013/0270419 A1 | 10/2013 | Singh et al. |
| 2013/0278785 A1 | 10/2013 | Nomura et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0160311 A1 | 6/2014 | Hwang et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0138381 A1 | 5/2015 | Ahn |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |
| 2015/0271471 A1 | 9/2015 | Hsieh et al. |
| 2015/0281678 A1 | 10/2015 | Park et al. |
| 2015/0286033 A1 | 10/2015 | Osborne |
| 2015/0296112 A1 | 10/2015 | Park et al. |
| 2015/0316744 A1 | 11/2015 | Chen |
| 2015/0334309 A1 | 11/2015 | Peng et al. |
| 2016/0044250 A1 | 2/2016 | Shabtay et al. |
| 2016/0070088 A1 | 3/2016 | Koguchi |
| 2016/0154202 A1 | 6/2016 | Wippermann et al. |
| 2016/0154204 A1 | 6/2016 | Lim et al. |
| 2016/0212358 A1 | 7/2016 | Shikata |
| 2016/0212418 A1 | 7/2016 | Demirdjian et al. |
| 2016/0241751 A1 | 8/2016 | Park |
| 2016/0291295 A1 | 10/2016 | Shabtay et al. |
| 2016/0295112 A1 | 10/2016 | Georgiev et al. |
| 2016/0301840 A1 | 10/2016 | Du et al. |
| 2016/0353008 A1 | 12/2016 | Osborne |
| 2016/0353012 A1 | 12/2016 | Kao et al. |
| 2017/0019616 A1 | 1/2017 | Zhu et al. |
| 2017/0070731 A1 | 3/2017 | Darling et al. |
| 2017/0187962 A1 | 6/2017 | Lee et al. |
| 2017/0214846 A1 | 7/2017 | Du et al. |
| 2017/0214866 A1 | 7/2017 | Zhu et al. |

(56) References Cited

U.S. PATENT DOCUMENTS

| | | |
|---|---|---|
| 2017/0242225 A1 | 8/2017 | Fiske |
| 2017/0289458 A1 | 10/2017 | Song et al. |
| 2018/0013944 A1 | 1/2018 | Evans, V et al. |
| 2018/0017844 A1 | 1/2018 | Yu et al. |
| 2018/0024329 A1 | 1/2018 | Goldenberg et al. |
| 2018/0059379 A1 | 3/2018 | Chou |
| 2018/0120674 A1 | 5/2018 | Avivi et al. |
| 2018/0150973 A1 | 5/2018 | Tang et al. |
| 2018/0176426 A1 | 6/2018 | Wei et al. |
| 2018/0198897 A1 | 7/2018 | Tang et al. |
| 2018/0241922 A1 | 8/2018 | Baldwin et al. |
| 2018/0295292 A1 | 10/2018 | Lee et al. |
| 2018/0300901 A1 | 10/2018 | Wakai et al. |
| 2019/0121103 A1 | 4/2019 | Bachar et al. |

FOREIGN PATENT DOCUMENTS

| | | |
|---|---|---|
| CN | 102739949 A | 10/2012 |
| CN | 103024272 A | 4/2013 |
| CN | 103841404 A | 6/2014 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2004133054 A | 4/2004 |
| JP | 2004245982 A | 9/2004 |
| JP | 2005099265 A | 4/2005 |
| JP | 2006238325 A | 9/2006 |
| JP | 2007228006 A | 9/2007 |
| JP | 2007306282 A | 11/2007 |
| JP | 2008076485 A | 4/2008 |
| JP | 2010204341 A | 9/2010 |
| JP | 2011085666 A | 4/2011 |
| JP | 2013106289 A | 5/2013 |
| KR | 20070005946 A | 1/2007 |
| KR | 20090058229 A | 6/2009 |
| KR | 20100008936 A | 1/2010 |
| KR | 20140014787 A | 2/2014 |
| KR | 101477178 B1 | 12/2014 |
| KR | 20140144126 A | 12/2014 |
| KR | 20150118012 A | 10/2015 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

A 3MPixel Multi-Aperture Image Sensor with 0.7μm Pixels in 0.11μm CMOS, Fife et al., Stanford University, 2008, 3 pages.

Dual camera intelligent sensor for high definition 360 degrees surveillance, Scotti et al., Publisher: IET, May 9, 2000, 8 pages.

Dual-sensor foveated imaging system, Hua et al., Publisher: Optical Society of America, Jan. 14, 2008, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 pages.

Multispectral Bilateral Video Fusion, Bennett et al., Publisher: IEEE, May 2007, 10 pages.

Super-resolution imaging using a camera array, Santacana et al., Publisher: Optical Society of America, 2014, 6 pages.

Optical Splitting Trees for High-Precision Monocular Imaging, McGuire et al., Publisher: IEEE, 2007, 11 pages.

High Performance Imaging Using Large Camera Arrays, Wilburn et al., Publisher: Association for Computing Machinery, Inc., 2005, 12 pages.

Real-time Edge-Aware Image Processing with the Bilateral Grid, Chen et al., Publisher: ACM SIGGRAPH, 2007, 9 pages.

Superimposed multi-resolution imaging, Carles et al., Publisher: Optical Society of America, 2017, 13 pages.

Viewfinder Alignment, Adams et al., Publisher: EUROGRAPHICS, 2008, 10 pages.

Dual-Camera System for Multi-Level Activity Recognition, Bodor et al., Publisher: IEEE, Oct. 2014, 6 pages.

Engineered to the task: Why camera-phone cameras are different, Giles Humpston, Publisher: Solid State Technology, Jun. 2009, 3 pages.

Office Action in related CN application 202010957238.9, dated May 31, 2021, 4 pages.

ROTATIONAL BALL-GUIDED VOICE COIL MOTOR

CROSS REFERENCE TO RELATED APPLICATIONS

This application is a continuation application from U.S. patent application Ser. No. 16/154,093 filed Oct. 8, 2018 (now allowed), which was a continuation application from U.S. patent application Ser. No. 15/559,039 filed Sep. 16, 2017 (issued as U.S. Pat. No. 10,488,631), which was a 371 National Phase application from international application PCT/IB2017/052383 filed Apr. 25, 2017, and claims priority from U.S. Provisional Patent Applications No. 62/343,011 filed May 30, 2016 and 62/353,278 filed Jun. 22, 2016, both of which are incorporated herein by reference in their entirety.

FIELD

Embodiments disclosed herein relate in general to actuating mechanisms ("actuators") and in particular to voice coil motor (VCM) actuators for digital cameras.

BACKGROUND

High-end digital camera modules, and specifically cell-phone (e.g. smartphone) digital cameras include mechanisms that enable advanced optical function such as focus or optical image stabilization (OIS). Such mechanisms may actuate (e.g. displace, shift or tilt) an optical element (e.g. lens, image sensor, mirror) to create the desired optical function. A commonly used actuator is based on voice coil motor (VCM) technology. In VCM technology, a fixed (or permanent) magnet and a coil are used to create actuation force. The coil is positioned in the vicinity of the magnetic field of the fixed magnet. Upon driving current in the coil, a Lorentz force is created on the coil, an in return an equal counter-force is applied on the magnet. The magnet or the coil is rigidly attached to an optical element to construct an actuated assembly. The actuated assembly is then moved by the magnetic Lorenz force. Henceforth, the term VCM may be used to also refer to "VCM actuator".

In addition to the magnetic force, a mechanical rail is used to set the course of motion for the optical element. The mechanical rail keeps the motion of the optical element in a desired path, as required by optical needs. A typical mechanical rail is known in the art as "spring-guided rail", in which a spring or set of springs is used to set the motion direction. A VCM that includes a spring-guided rail is referred to as "spring-guided VCM". For example, U.S. patent application 20110235196 discloses a lens element being shifted in a linear spring rail to create focus. For example, international patent application PCT/IB2016/052179 discloses the incorporation and use of a spring guided VCM in a folded camera structure (FCS). The disclosure teaches a lens element being shifted to create focus and OIS and a light folding element being shifted in a rotational manner to create OIS.

Another typical mechanical rail is known in the art a "ball-guided rail", see e.g. U.S. Pat. No. 8,810,714. With a ball-guided rail, the optical element is bound to move in the desired direction by set of balls confined in a groove (also referred to as "slit"). A VCM that includes a ball-guided rail is referred to as a "ball-guided VCM". A ball-guided VCM has several advantages over a spring-guided VCM. These include: (1) lower power consumption, because in a spring-guided VCM the magnetic force has to oppose a spring mechanical force, which does not exist in a ball-guided VCM, and (2) higher reliability in drops which may occur during the life-cycle of a camera that includes the VCM.

While the actuation method showed in U.S. Pat. No. 8,810,714 allows linear motion only, in some cases there is a need to create angular motion as well, for example to rotate (tilt) a light folding element (mirror or prism) in order to create OIS as described in PCT/IB2016/052179. Therefore there is a need for, and it would be advantageous to have, a rotational ball-guided VCM, i.e. a ball-guided VCM that can cause rotation (tilt) of an optical element.

SUMMARY

Aspects of embodiments disclosed herein relate to VCM actuators having curved ball-guided mechanisms, and to digital cameras, and in particular cameras with folded optics that incorporate VCMs.

In some exemplary embodiments there is provided an actuator for rotating or tilting an optical element, comprising a first VCM and a first curved ball-guided mechanism operative to create a rotation or tilt movement of the optical element around a first rotation axis upon actuation by the VCM.

In an embodiment, the first VCM includes a coil mechanically coupled to a static base and a fixed magnet mechanically coupled to a holder for holding the optical element, and the rotation or tilt movement is created by a current passing through the coil.

In an embodiment, an actuator further comprises a ferromagnetic yoke attached to the static base and used to pull the fixed magnet in order to prevent the first curved ball-guided mechanism from coming apart.

In an embodiment, the first ball-guided mechanism includes a pair of grooves having a plurality of balls located therebetween, wherein at least one of the grooves in the pair has a curvature defined by a radius that starts at a center of curvature which lies on the rotation axis.

In an embodiment, the optical element includes an optical path folding element (OPFE) that folds light from a first optical axis to a second optical axis. The OPFE may be exemplarily a prism or a mirror.

In an embodiment, the first rotation axis includes an axis perpendicular to both the first optical axis and the second optical axis.

In an embodiment, the first rotation axis includes an axis combining the second optical axis and an axis perpendicular to both the first optical axis and the second optical axis.

In an embodiment, the first curved ball-guided mechanism is positioned below the OPFE.

In an embodiment, the fixed magnet and the coil are positioned below the OPFE.

In an embodiment, the fixed magnet and the coil are positioned on a side of the OPFE in a plane parallel to a plane that includes both the first axis and the second optical axis.

In an embodiment, an actuator further comprises a position sensor for measuring an angle of the optical element relative to the static base.

In an embodiment, the position sensor is a Hall bar position sensor operative to measure the magnetic field of the fixed magnet.

In some embodiments, an actuator further comprises a second VCM and a second curved ball-guided mechanism operative to create a rotation or tilt movement of the optical element around a second rotation axis upon actuation by the second VCM, wherein the first rotation axis and the second rotation axis are not parallel.

In an embodiment, the first rotation axis and the second rotation axis are substantially orthogonal to each other.

In an embodiment, the first VCM includes a first coil mechanically coupled to a static base and a first fixed magnet mechanically coupled to a holder for holding the optical element, wherein the second VCM includes a second coil mechanically coupled to a static base and a second fixed magnet mechanically coupled to a holder for holding the optical element, and wherein the first rotation or tilt movement and the second rotation or tilt movement are created by a combination of currents passing through the first coil and the second coil.

In an embodiment, the first and second magnets are unified as a single magnet.

In an embodiment, an actuator further comprises a ferromagnetic yoke attached to the static base and used to pull the fixed magnet in order to prevent the first curved ball-guided mechanism and the second curved ball-guided mechanism from coming apart.

In an embodiment, the optical element includes an optical path folding element (OPFE) that folds light from a first optical axis to a second optical axis.

In an embodiment, the first rotation axis includes an axis perpendicular to both the first optical axis and the second optical axis, and the second rotation axis includes an axis parallel to either the first optical axis or the second optical axis In an embodiment, an actuator further comprises a first position sensor and a second position sensor, wherein a combination of two position measurements allows determination of the position of the optical element holder relative to the static base with respect to both the first rotation axis and the second rotation axis.

In an embodiment, the center of curvature resides inside the optical element.

In an embodiment, the center of curvature resides outside the optical element.

In some exemplary embodiments, there are provides cameras comprising an actuator described above and below.

In some camera embodiments, the rotation or tilt movement is for allowing optical image stabilization.

In some camera embodiments, the rotation or tilt movement is for allowing extended field of view scanning.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way.

DETAILED DESCRIPTION

Figure 1A:
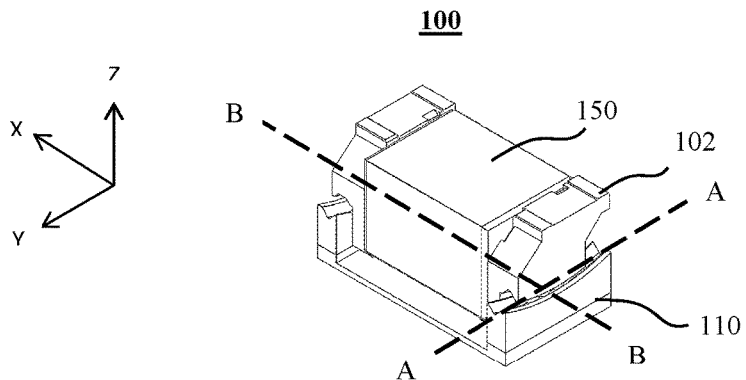
FIG. 1A shows an embodiment of a rotational ball-guided VCM actuator disclosed herein in an isomeric view.
Figure 1B:
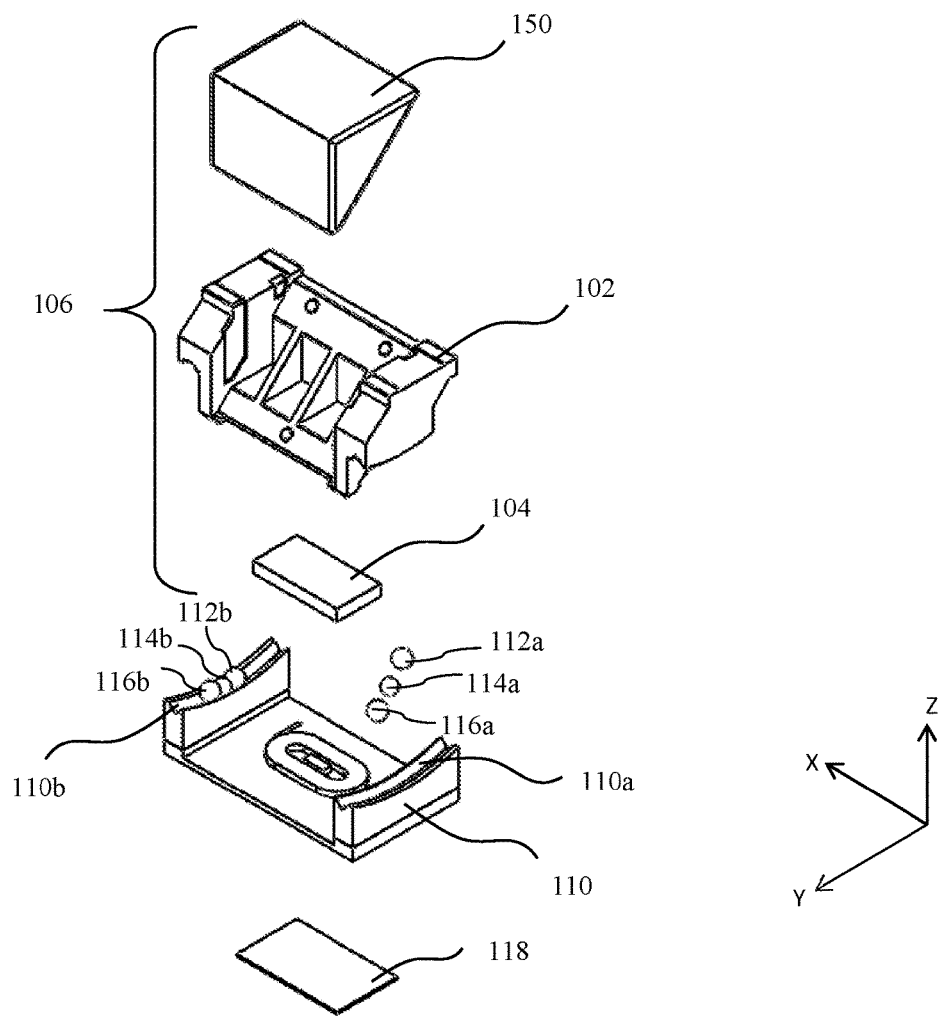
FIG. 1B shows the VCM actuator of FIG. 1A in an exploded view.
Figure 1C:
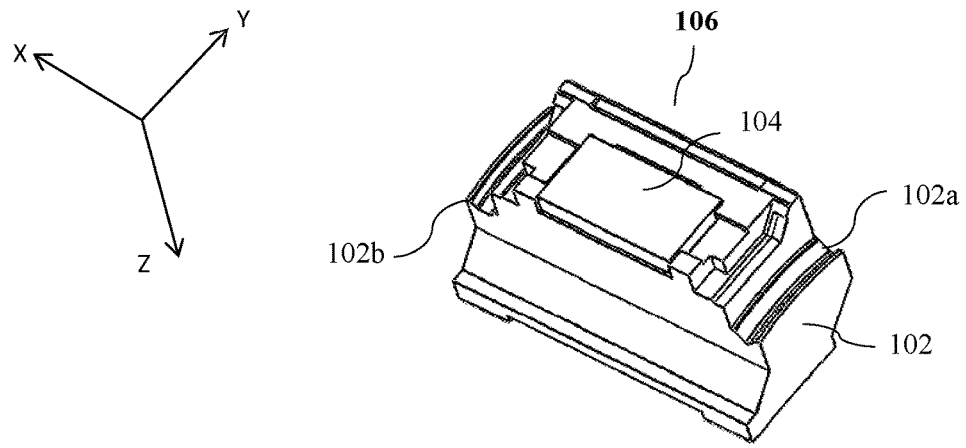
FIG. 1C shows a bottom view of an actuated sub-assembly in the VCM actuator of FIG. 1A.

FIGS. 1A-F show schematically various views and components of an exemplary embodiment of a rotational ball-guided VCM actuator disclosed herein and numbered 100. For simplicity, the term "VCM actuator" or just "actuator" will replace the term "rotational ball-guided VCM actuator" in the description hereinbelow. FIG. 1A shows actuator 100 in an isomeric view and FIG. 1B shows actuator 100 in an exploded view. Actuator 100 allows tilting of an optical path folding element (OPFE) 150 around a single axis (exemplarily and as shown, axis X), as further described below. OPFE 150 folds light from a first optical axis (aligned with Z) to a second optical axis (aligned with Y). In FIGS. 1A, 1B, OPFE 150 is exemplarily a prism. In other embodiments, the OPFE may be, for example, a mirror or a lens. Actuator 100 has exemplary length/width/height dimensions in the range of 5-15 mm, i.e. actuator 100 can be contained in a box with dimension of 5×5×5 mm³ to 15×15×15 mm³. The description continues with reference to a coordinate system XYZ shown in FIGS. 1A and 1B as well as in a number of other figures.

Figure 1D:
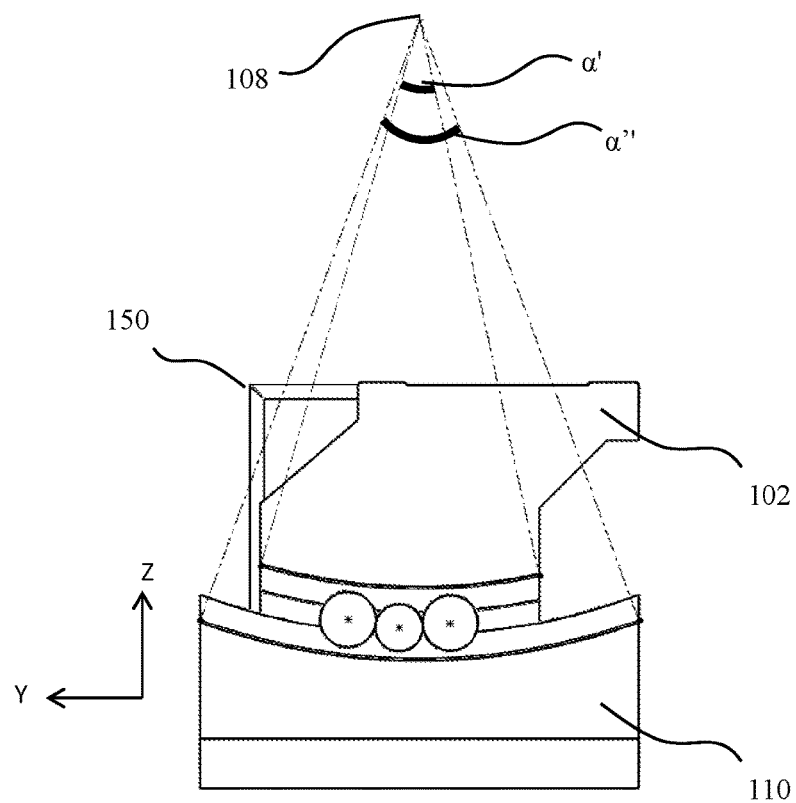
FIG. 1D shows a cross section of the VCM actuator along a line A-A marked in FIG. 1A.
Figure 1E:
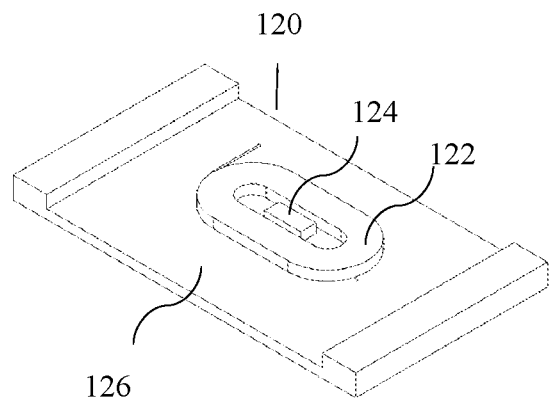
FIG. 1E shows details of an electro-magnetic sub-assembly in the VCM actuator of FIG. 1A.
Figure 1F:
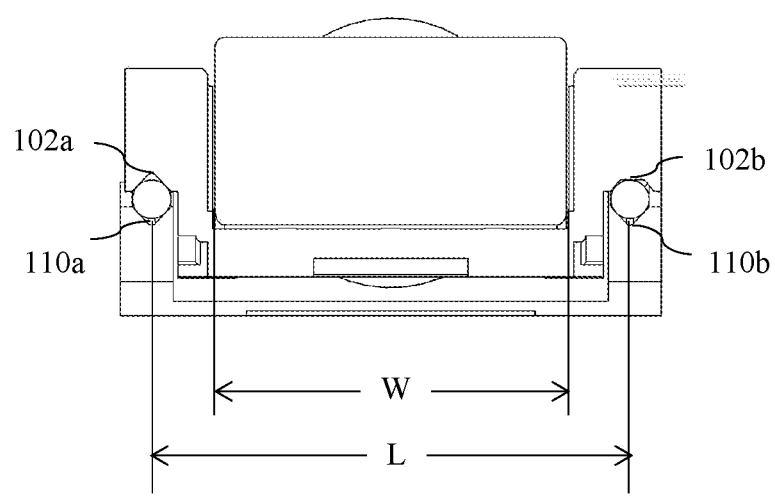
FIG. 1F shows a cross section of the VCM actuator along a line B-B marked in FIG. 1A.

In actuator 100, OPFE 150 may be held in an optical element holder 102, which can be made, for example, by a plastic mold that fits the shape of element OPFE 150. A permanent (fixed) magnet 104 is fixedly attached (e.g. glued) to optical element holder 102 from below (negative Z direction in the FIG. 1A). Hereinafter, the term "below" used with reference to an OPFE (e.g. prism) will refer to a side of the OPFE opposite to the side receiving light along the first optical axis. OPFE 150, optical element holder 102 and magnet 104 form an "actuated sub-assembly" 106. Actuated sub-assembly 106 is shown from a bottom view in FIG. 1C. FIG. 1D shows a cross section of actuator 100 along a line A-A marked in FIG. 1A. FIG. 1E shows details of an electro-magnetic (EM) sub-assembly of actuator 100. FIG. 1F shows a cross section of actuator 100 along a line B-B marked in FIG. 1A. Optical element holder 102 includes (i.e. is molded with) two parallel arc-shaped (or "curved") grooves 102a and 102b (FIG. 1C) positioned at two opposite sides of holder 102, each arc-shaped groove having an angle α'>α, where angle α is a required tilt stroke, as defined by optical needs. Angle α' is shown in FIG. 1D. Arc-shaped grooves 102a and 102b have a center of curvature on a common rotation axis 108 (FIG. 1D).

The distance of axis 108 from grooves 102a and 102b (radius of curvature) is typically 2-15 mm. As such axis 108 may pass through (be internal to) OPFE 150 or outside of (be external to) OPFE 150, see also FIG. 1K. For optical image stabilization (OIS), α may exemplarily be in the range 0.25°<α<2°. To obtain an adjustable extended Tele field of view (FOV) in a dual-aperture zoom digital camera such as that described in co-owned U.S. Provisional patent application No. 62/272367, α may exemplarily be in the range 2°<α<12°. Typically, α' is greater than α by about 0.5°.

Actuator 100 further includes a base 110, typically made of plastic. Base 110 is also molded with two arc-shaped grooves 110a and 110b positioned at two opposite sides of base 110, each arc-shaped groove (110a and 110b) having an angle α">α. Angle α" is also shown in FIG. 1D. Typically, α" is greater than α by about 0.5°. Arc-shaped grooves 110a and 110b also have a center of curvature on axis 108 (FIG. 1D). Actuated sub-assembly 106 is positioned inside base 110 such that grooves 110a and 110b are parallel to and adjacent to grooves 102a and 102b respectively, and the centers of curvature for each couple of grooves are concentric respectively with axis 108.

Since optical element holder 102 and base 110 are preferably plastic-molded (although they may also be made of aluminum or other metals) there is some tolerance allowed in part dimensions, typically up to a few tens of microns for each dimension. This tolerance may lead to misalignment of position between adjacent grooves 102a-110a and/or 102b-110b. In the embodiment shown and for better alignment, grooves 102a, 110a and 110b have what is known in the art as a (non-limiting) 'V'-groove cross-section shape to match the balls, while groove 102b has a cross-section which is wider and has a (non-limiting) 'trapezoid' cross-section. Grooves 102a and 110a are then aligned during assembly, while grooves 102b and 110b have some alignment freedom allowed by the trapezoid cross section. In other embodiments, all grooves (102a, 102b, 110a, and 110b) may have a V-shape.

In actuator 100, three balls 112a, 114a and 116a are positioned in the space between grooves 102a and 110a and three balls 112b, 114b and 116b are positioned in the space between grooves 102b and 110b. The number of balls (here 3) is exemplary. In other embodiments, a disclosed VCM actuator may have more or less of three balls (e.g. 2-7 balls) in the space between adjacent grooves. The balls are typically made of Alumina or another ceramic material, but may also be made of metal, plastic or other materials. The balls have a typical diameter in the range of 0.3-1 mm. Note that in actuator 100, a distance L between grooves 102a,b and grooves 110a,b (and their respective sets of balls) is larger than a width W of OPFE 150, such that the grooves and balls are "outside" of OPFE 150 with respect to the X axis.

Figure 1G:
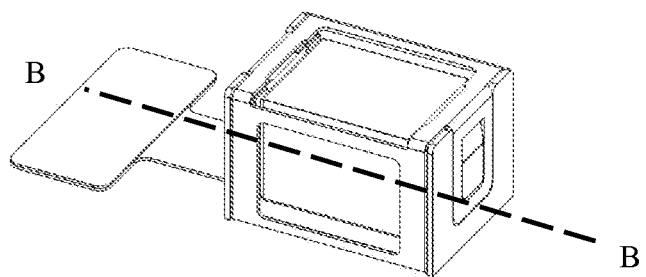
FIG. 1G shows another embodiment of a rotational ball-guided VCM actuator disclosed herein in an isomeric view.
Figure 1H:
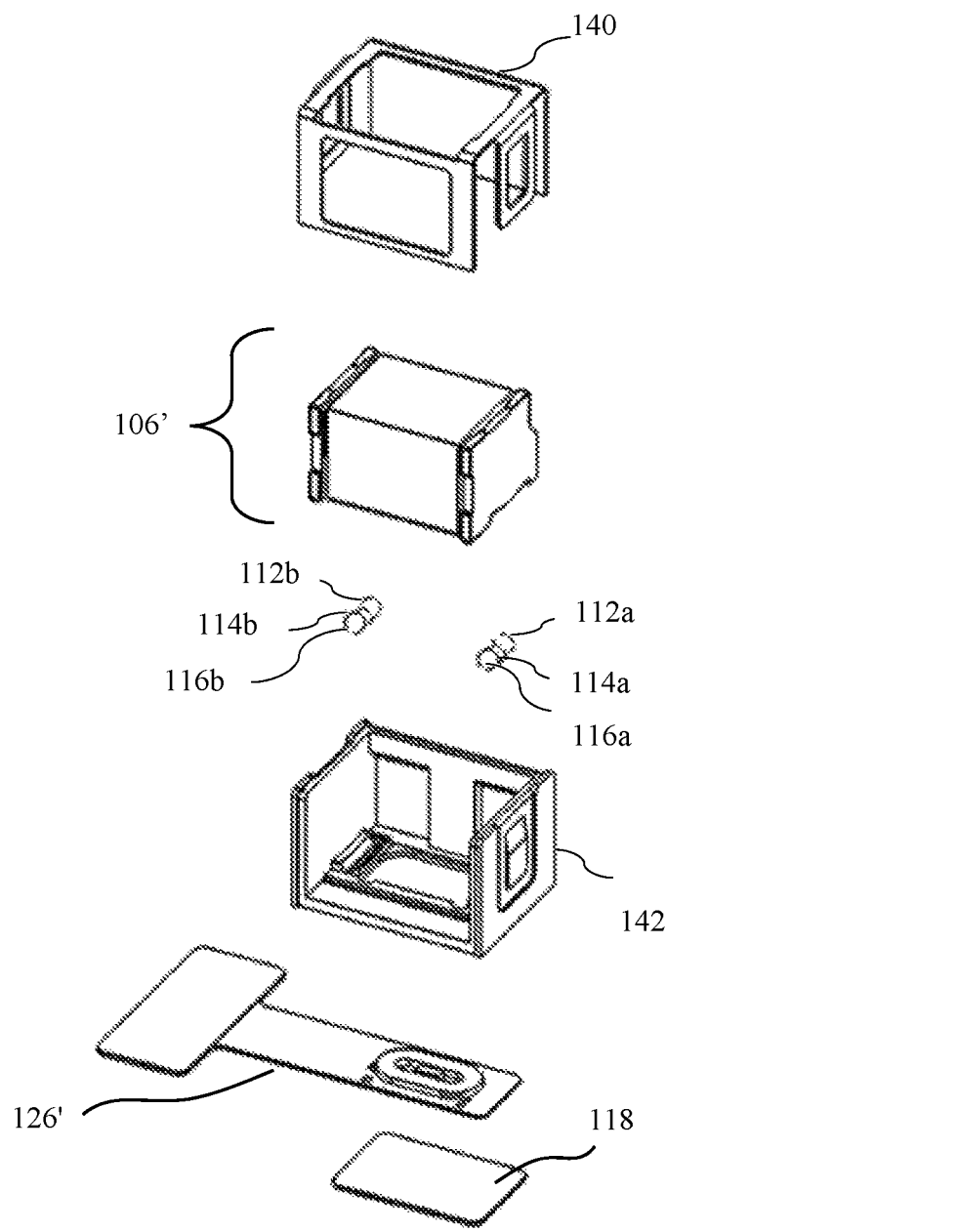
FIG. 1H shows the VCM actuator of FIG. 1G in an exploded view.
Figure 1I:
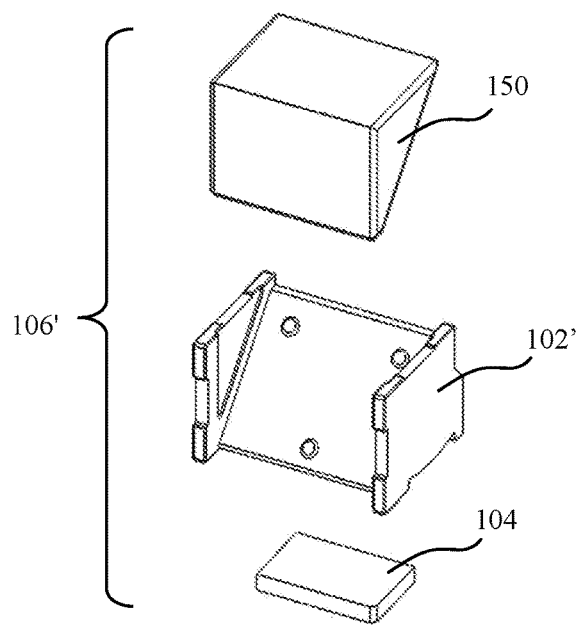
FIG. 1I shows details of an actuated sub-assembly in the actuator of FIG. 1G.
Figure 1J:
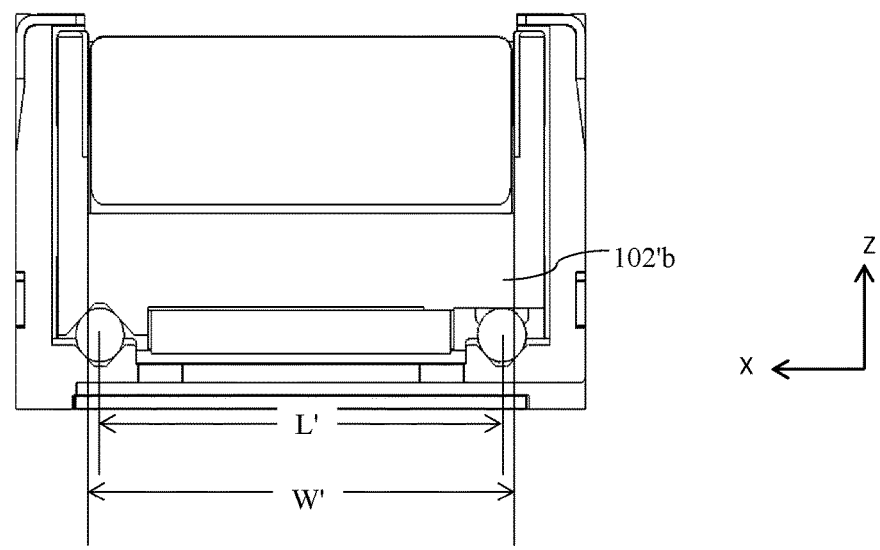
FIG. 1J shows a cross section of the VCM actuator along a line B-B marked in FIG. 1G.
Figure 1K:
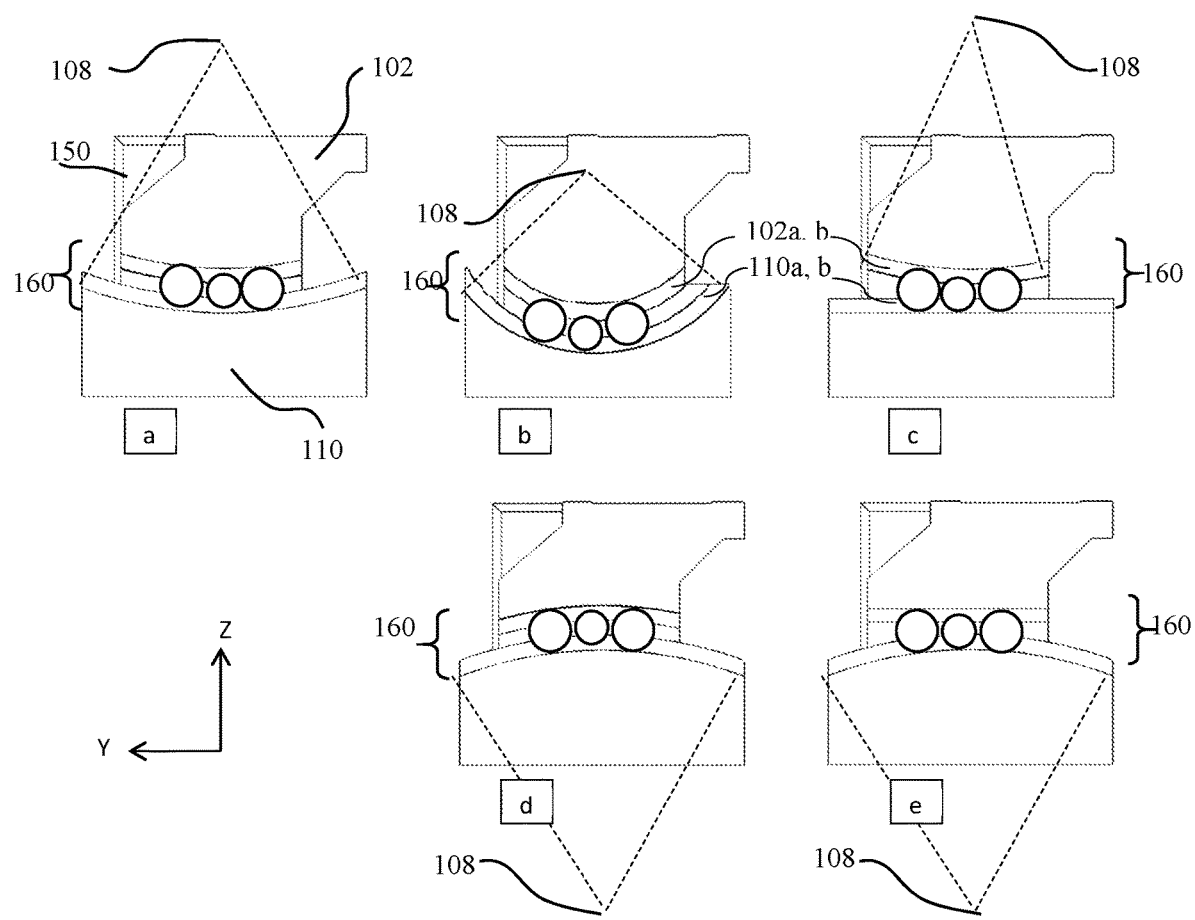
FIG. 1K shows schematically in a side view alternative embodiments of groove pairs.

In actuator 100, grooves 102a, 102b, 110a, 110b and balls 112a, 112b, 114a, 114b, 116a and 116b form a curved ball-guided mechanism 160 operative to impart a rotation or tilt movement to an optical element (e.g. OPFE 150) upon actuation by the VCM actuator (see FIG. 1K)

In some embodiments, two different ball sizes may be used to provide smoother motion. The balls can be divided into a large diameter (LD) group and a small diameter (SD) group. The balls in each group have the same diameter. LD balls may have for example a 0.1-0.3 mm larger diameter than SD balls. A SD ball may be positioned between two LD balls to maintain the rolling ability of the mechanism. For example, in an embodiment, balls 112a and 116a may be LD balls and ball 114a may be a SD ball.

A metallic ferromagnetic yoke 118 is fixedly attached (e.g. glued) to base 110 from below (negative Z direction in the FIG. 1B), such that it faces magnet 104. The yoke 118 pulls magnet 104 (and thus pulls the actuated sub-assembly 106) by magnetic force and thus holds the curved ball-guided mechanism from coming apart. The magnetic force is in a direction marked in FIGS. 1A-C as the negative Z direction. Balls 112a, 114a and 116a and balls 112b, 114b and 116b prevent actuated sub-assembly 106 from touching the base. Actuated sub-assembly 106 is thus confined along the Z-axis and does not move in positive or negative Z directions. Curved ball-guided mechanism 160 further confines the actuated sub-assembly along the X-axis, and thus the actuated sub-assembly can only move along the path defined by the parallel arc-shaped grooves 102a, 102b, 110a and 110b.

Actuator 100 further includes an EM sub-assembly 120, FIG. 1E. Electro-magnetic sub-assembly 120 includes a coil 122, a position sensor, for example a Hall bar element 124 and a printed circuit board (PCB) 126. Coil 122 and Hall bar element 124 are preferably soldered (each on its own) to PCB 126. Coil 122 has a stadium (oval) shape, and typically has a few tens of windings (e.g. but not limited to 50-250), and a typical resistance of 10-30 ohm. PCB 126 allows sending input and output currents to coil 122 and Hall bar element 124. The currents carry both power and electronic signals needed for operation. PCB 126 is connected electronically to a camera (e.g. a camera as in FIG. 2) which actuator 100 is part of, using wires (not shown). Electro-magnetic sub-assembly 120 is positioned between magnet 104 and yoke 118. Driving a current in coil 122 creates a Lorentz force: a current in a clockwise direction will create force in the positive Y direction, while a current in counter clockwise direction will create a force in the negative Y direction. The full magnetic scheme (e.g. fixed magnet 104 pole direction) is known in the art and described for example in detail in co-owned patent PCT/IB2016/052179.

While magnetic force applied by the electro-magnetic sub-assembly is in the positive and negative Y directions, the rail formed by the balls and grooves cause confined actuated sub-assembly 104 to move along an arc parallel to grooves 102a, 102b, 110a and 110b. Hall bar element 124 can sense the intensity and direction of the magnetic field of magnet 104. Upon actuation, the relative position of actuated sub-assembly 106 and Hall bar element 124 is changed. The intensity and direction of the magnetic field sensed by Hall bar element 124 change as well, and thus the position of actuated sub-assembly 106 can be determined.

A control circuit is used to control the position of the actuated sub-assembly and to set it to the position required by optical demands. The control circuit input is a signal from Hall bar element 124 and the output is the amount of current applied in coil 122. The control circuit may be implemented in an integrated circuit (IC). In some cases the IC may be combined with Hall element 124. In other cases, the IC may be a separate chip (not shown), which can be located outside of actuator 100 and of a camera including actuator 100 (e.g. see below embodiment 200).

FIGS. 1G-1J show schematically various views and components of another exemplary embodiment of a VCM actuator disclosed herein and numbered 100'. FIG. 1G shows actuator 100 in an isomeric view, FIG. 1H shows actuator 100 in an exploded view, FIG. 1I shows details of an actuated sub-assembly 106' in the actuator of FIG. 1G, and FIG. 1J shows a cross section of the VCM actuator along a line B-B marked in FIG. 1G. Actuator 100' is similar to actuator 100 in structure (and therefore similar elements/components are not numbered and/or described) and function except for a few differences: a) actuator 100' includes three V-shaped grooves and one flat groove, i.e. exemplarily, in actuator 100' optical element holder 102 is replaced by an optical element holder 102' in which groove 102b' is flat; b) in actuator 100', a distance L' between grooves 102a,b and grooves 110a,b (and their respective sets of balls) is equal to or smaller than a width W' of OPFE 150, such that the grooves and balls are "below" OPFE 150. Thus, at least one dimension (width) and consequently the size of actuator 100' is smaller than that of actuator 100; and c) actuator 100' includes an added component, a shield 140, which protect it from drops, hits, dust and stray light. The shape and dimensions of shield 140 are such as to minimally affect the size of the actuator. The shape and details shown are exemplary. Optionally, a shield such a shield 140 may also be provided for actuator 100. Further and optionally actuator 100' also includes an enclosure 142 (normally made of plastic) to protect the actuator against environmental and other factors. PCB 126' has the same function as PCB 126 in actuator 100. A curved ball-guided mechanism in actuator 100' includes essentially the same components as in actuator 100.

The shape of the grooves in a curved ball-guided mechanism disclosed in actuators 100 and 100' is exemplary, and other shapes are possible, as indicated in FIG. 1K. FIG. 1K shows in addition to shape embodiments "a" and "b" (axis 108 external or internal to OPFE 150, with both grooves 102 and 110 of a pair curved "downwards", i.e. with the center of curvature "above" the grove in the positive Z direction), a shape embodiment in "c" in which a groove 102 is curved downwards and a groove 110 is straight (linear), a shape embodiment in "d" in which both grooves 102 and 110 are curved upwards (center of curvature below the groove in the negative Z direction) and a shape embodiment in "e" in which grooves 102 are straight and grooves 110 are curved upwards.

Figure 2:
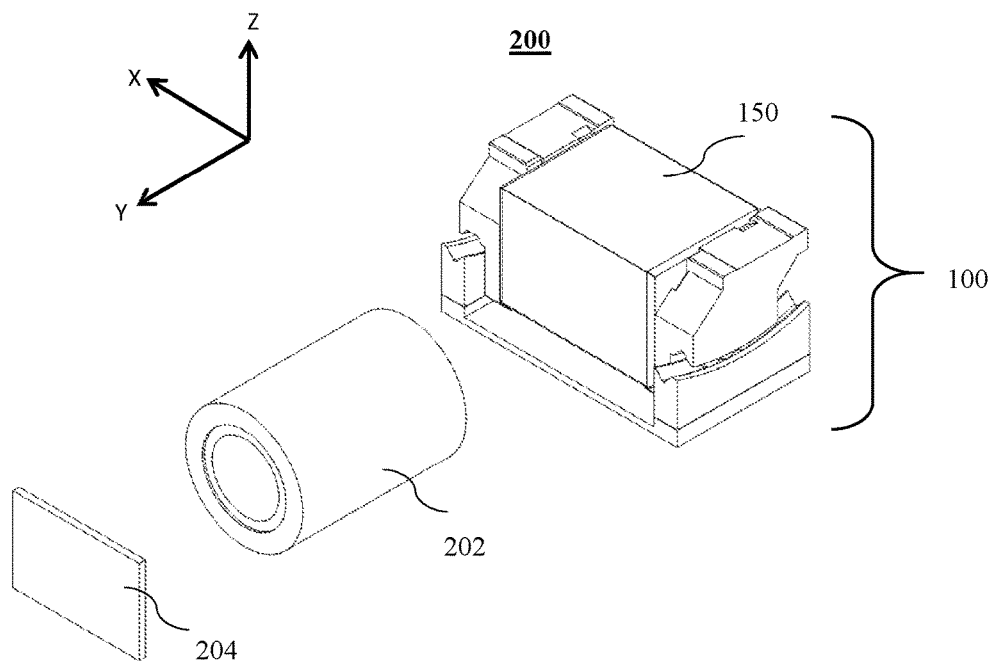
FIG. 2 shows the actuator of FIGS. 1A-1F, coupled to a folded camera.

FIG. 2 shows actuator 100 coupled to folded camera structure (FCS) or simply "folded camera" 200. In folded camera 200, an actuator such as 100 (or 100') serves for example to rotate a light folding element, for example prism 150. For simplicity, the description continues with reference to actuator 100, with the understanding that it applies equally well to actuator 100'. Actuation by actuator 100 in folded camera 200 can be used, for example, to create optical image stabilization (OIS) as described in PCT/IB2016/052179 or to create an extended field of view, as described for example in PCT/IB2016/057366. A typical rotational stroke α in this case may be in the range of ±0.5 to ±2 degrees or ±2 to ±12 degrees of the original position of prism 150 respectively. Camera 200 further includes a lens element 202 and an image sensor 204.

Folded camera 200 may further be coupled to or include actuation mechanisms to actuate lens element 204 for AF and\or OIS, for example described in PCT/IB2016/052179. The actuation mechanisms (and actuations) of lens 204 are independent of those of actuator 100 and are not shown in FIG. 2. The actuation mechanisms (and actuations) of lens 204 may be based on a VCM actuator with mechanical rails based on springs (as in PCT/IB2016/052179) or with mechanical rails based on a ball-guided mechanism.

Figure 3A:
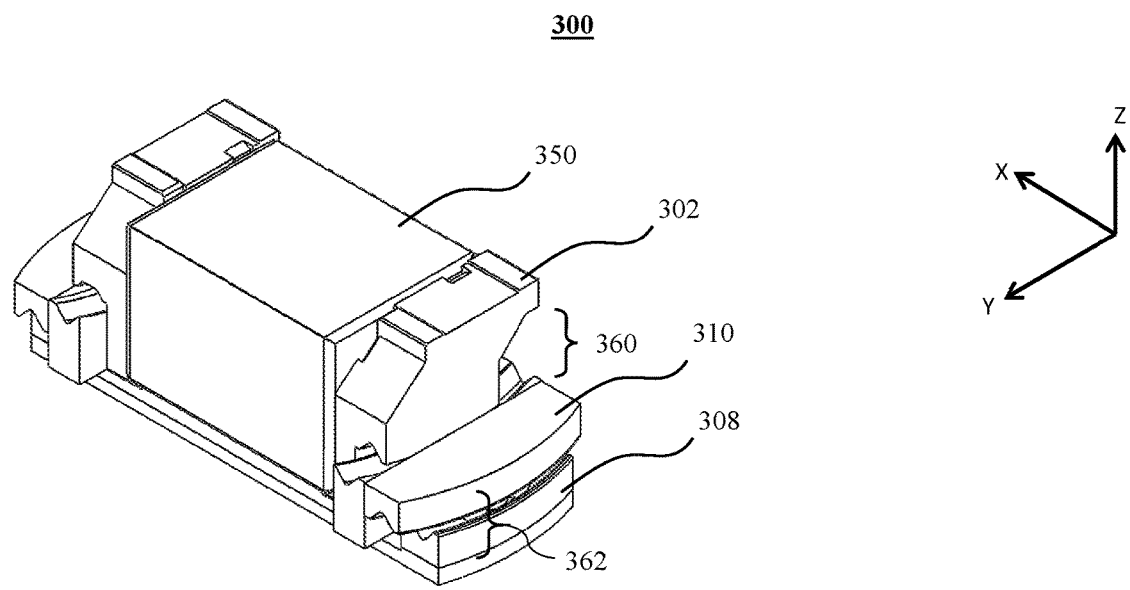
FIG. 3A shows yet another embodiment of a rotational ball-guided VCM actuator disclosed herein in an isomeric view.
Figure 3B:
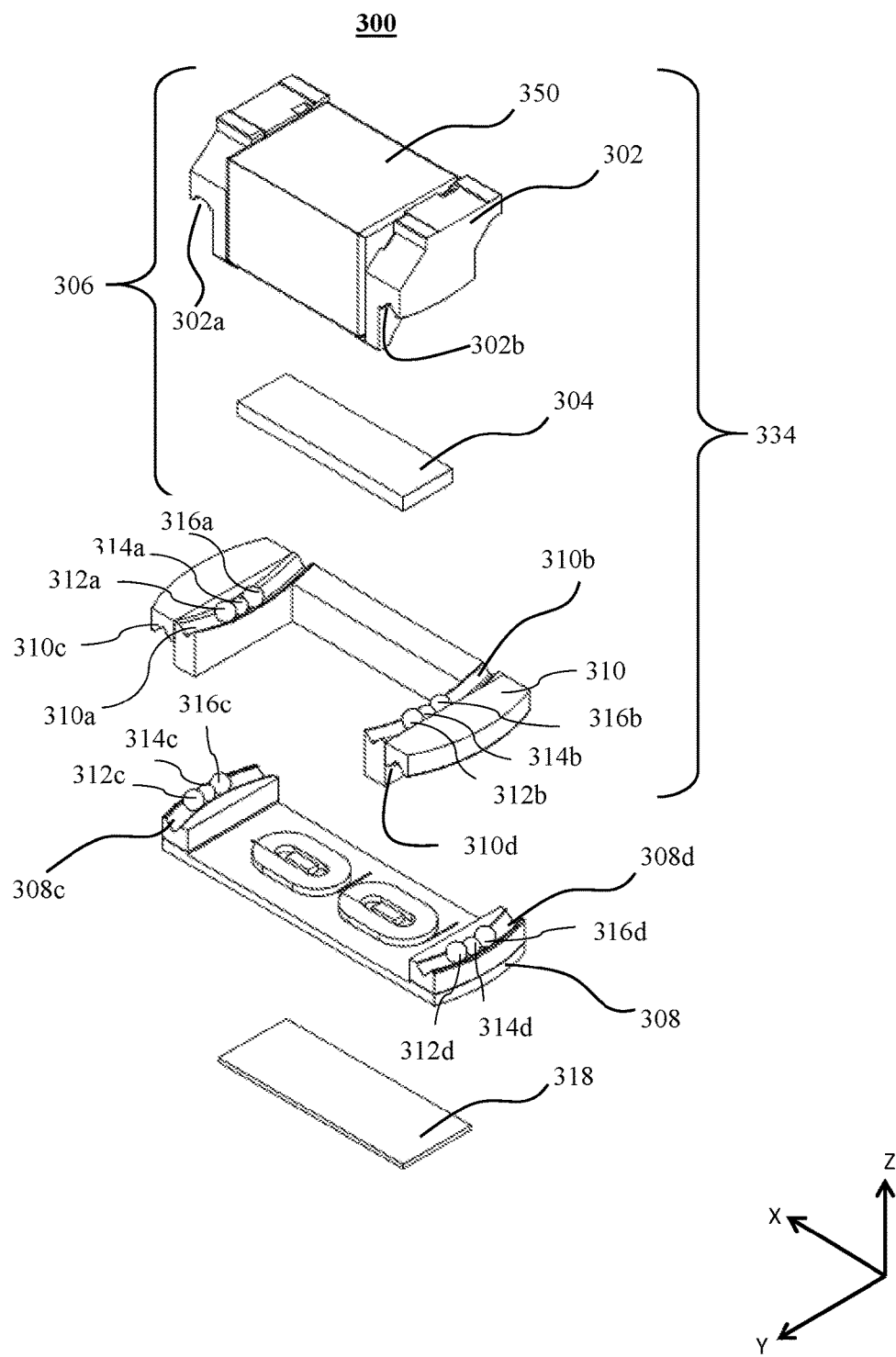
FIG. 3B shows the VCM actuator of FIG. 3A in an exploded view.

FIGS. 3A-D shows schematically various views and components of another exemplary embodiment of a VCM actuator disclosed herein and numbered 300. FIG. 3A shows actuator 300 in an isomeric view and FIG. 3B shows actuator 300 in an exploded view. As in actuator 100, in actuator 300 an OPFE 350 is exemplarily a prism. OPFE 350 is held in an optical element holder 302. A permanent magnet 304 is fixedly attached (e.g. glued) to optical element holder 302. OPFE 350, optical element holder 302 and magnet 304 form a "top actuated sub-assembly" 306. Optical element holder 302 includes (e.g. is molded with) two parallel arc-shaped grooves 302a and 302b positioned at two opposite sides of holder 302, each arc-shaped groove having an angle β'>β, where angle β is a required rotational stroke, as defined by optical needs. Angles β' and β" are not shown, but its definition is similar to that of angles α' and α" in FIG. 1D. Exemplary values and ranges for β, β' and β" are similar to those for α, α' and α" above. Top actuated sub-assembly 306 and its parts are similar to actuated sub-assembly 106 in terms of materials, dimensions, etc.

Figure 3C:
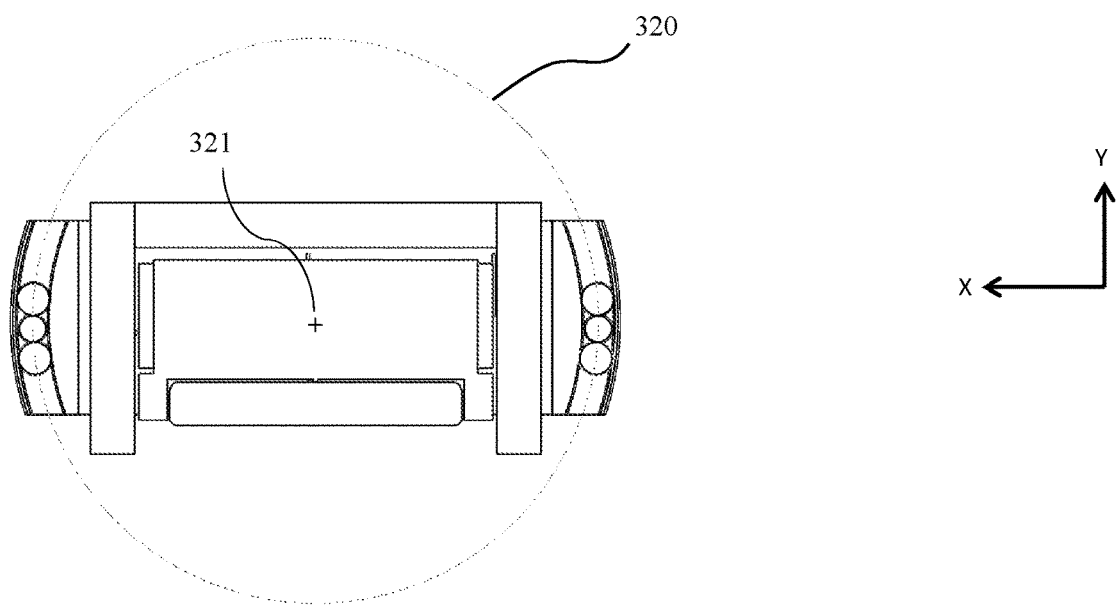
FIG. 3C shows details of a middle base of the VCM actuator of FIGS. 3A and 3B.

Actuator 300 further includes a middle base 310, typically made of plastic. Middle base 310 is also molded with two grooves 310a and 310b. Top-actuated sub-assembly 306 is positioned inside middle base 310 such that grooves 310a and 310b are parallel to grooves 302a and 302b respectively. In this embodiment, grooves 302b, 310a and 310b have V-groove shape, while groove 302a has a trapezoid shape; the considerations for these shapes was given above in the description of actuator 100. Three balls 312a, 314a and 316a are positioned between grooves 302a and 310a, and, similarly, three balls 312b, 314b and 316b are positioned between grooves 302b and 310b. In other embodiments, actuator 300 may have more or less than 3 balls in each groove, typically in the range of 2-7 balls. Considerations for size and materials of all balls are similar to those described in actuator 100. Middle base 310 further includes two more arc-shaped grooves 310c and 310d on a single circle 320, as seen in FIG. 3C. Top actuated sub-assembly 306, balls 312a-314a, 312b-314b and middle base 310 form a bottom actuated sub-assembly 334. The diameter of circle 320 may exemplarily be in the range of 5-15 mm. Grooves 302a, 302b, 310a, 310b and balls 312a, 312b, 314a, 314b, 316a and 316b form a first curved ball-guided mechanism 360 of actuator 300.

Actuator 300 further includes a bottom base 308. Bottom base 308 is typically made of plastic, and is molded with two arc-shaped grooves 308c and 308d. Arc-shaped grooves 308c and 308d are on circle 320 with a center on an axis 321, as can be seen in FIG. 3C. Bottom actuated sub-assembly 334 is positioned above bottom base 308 such that grooves 310c and 310d are parallel to grooves 308c and 308d respectively. In this embodiment, grooves 310c, 308c, 308d have V-groove shape, while groove 310d has a trapezoid shape; the considerations for these shapes were given above in the description of actuator 100. Three balls 312c, 314c and 316c are positioned between grooves 308c and 310c, and similarly three balls 312d, 314d and 316d are positioned between grooves 308d and 310d. In other embodiments, actuator 300 may have more or less of 3 balls in each groove, typically in the range of 2-7. The considerations for size and materials of all balls are similar to those described in actuator 100. Grooves 308c, 308d, 310c, 310d and balls 312c, 312d, 314c, 314d, 316c and 316d form a second curved ball-guided mechanism 362 of actuator 300.

A metallic yoke 318 is fixedly attached (e.g. glued) to bottom base 308 from below, such that it faces magnet 304. Metallic yoke 318 pulls magnet 304 (and thus pulls top actuated sub-assembly 306) by magnetic force and thus holds the two curved ball-guided mechanisms (360 and 362) from coming apart. The magnetic force is in direction marked in FIG. 1 as the negative Z direction. Balls 312a, 314a and 316a and 312b, 314b and 316b prevent top actuated sub-assembly 306 from touching middle base 310, and balls 312c, 314c and 316c and 312d, 314d and 316d prevent bottom actuated sub-assembly 334 from touching bottom base 308. Top actuated sub-assembly 306 is thus confined along the Z-axis and does not move in positive or negative Z directions. First curved ball-guided mechanism 360 further confines top actuated sub-assembly 306 along the X-axis, and thus top actuated sub-assembly 306 can only move along the path defined by the parallel arcs 302a, 302b, 310a and 310b. Bottom actuated sub-assembly 334 is confined along the Z-axis and does not move in positive or negative Z directions. Second curved ball-guided mechanism 362 further confines bottom actuated sub-assembly 334 to move only in a rotational manner around circle 320 (rotation around the Z-axis). The typical magnitude/angle of this rotation (in degrees) is similar to that of a above. Magnet 304 acts on both curved ball-guiding mechanism.

Figure 3D:
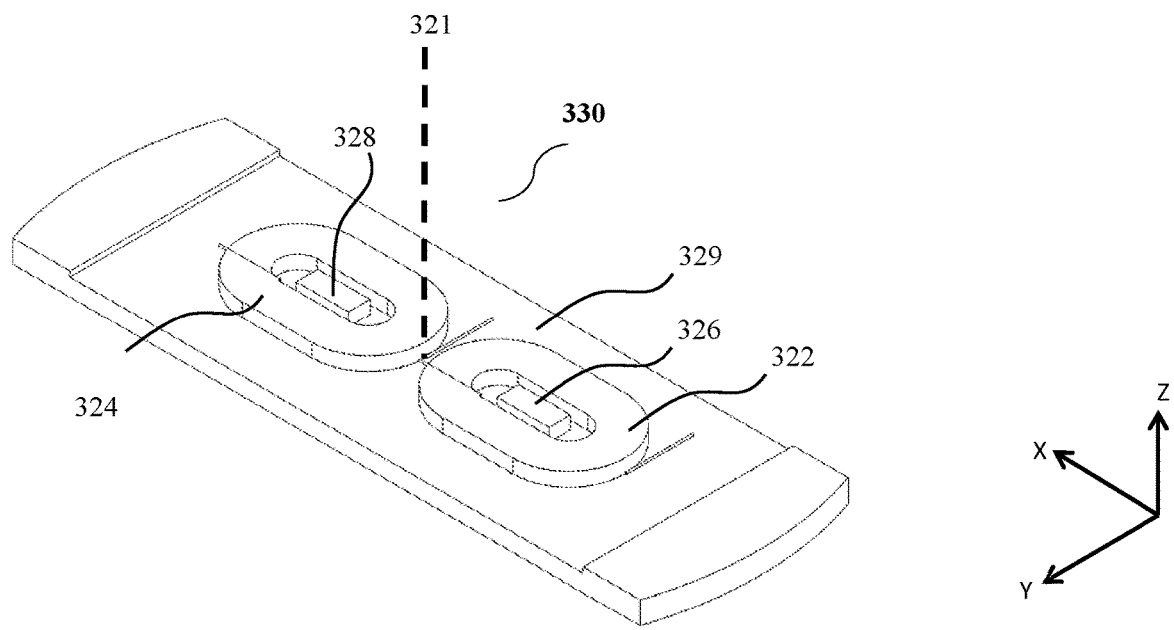
FIG. 3D shows details of an electro-magnetic sub-assembly in the VCM actuator of FIGS. 3A and 3B.

Actuator 300 further includes an electro-magnetic sub-assembly 330, shown in FIG. 3D. Electro-magnetic sub-assembly 330 includes two coils 322 and 324, two Hall bar elements 326 and 328 and a printed circuit board (PCB) 329. Coils 322, 324 and Hall bar elements 326, 328 are soldered (each one on its own) to PCB 329. Coils 322, 324 have a stadium shape, typically with a few tens of windings (for example, in a non-limiting range of 50-250), with a typical resistance 10-30 ohm each. PCB 329 allows sending input and output currents to coils 322, 324 and to Hall bar elements 326, 328, currents carrying both power and electronic signals needed for operation. PCB 329 is connected electronically to the external camera with wires not seen in FIG. 3. Electro-magnetic sub-assembly 330 is positioned between magnet 304 and yoke 318. Upon driving current in coils 322, 324 a Lorentz force is created; a current in a clockwise direction will create force in the positive Y direction while a current in a counter clockwise direction will create a force in the negative Y direction. The full magnetic scheme (e.g. fixed magnet 304 pole direction) is similar to that in actuator 100. As coil 322 (324) is not centered with circle 320, the Lorentz force is also translated to clockwise (counter clockwise) torque around Z axis on bottom actuated sub-assembly 334.

While the magnetic force applied by both of the coils 322 and 324 of electro-magnetic sub-assembly is in the positive and negative Y directions, top actuated sub-assembly 306 is confined by the first curved ball-guided mechanism to move along an arc parallel to grooves 302a, 302b, 310a and 310b (i.e. rotate around the X axis). Similarly bottom actuated sub-assembly 334 is confined by the second curved ball-guided mechanism to move around circle 320 (i.e. rotate around the Z axis), and its motion is dominated by the net torque around Z axis applied by coils 322 and 324 around axis 321 (the difference between the torque around Z axis each of the coils applies). Hall bar elements 326, 328 can sense the intensity and direction of the magnetic field of magnet 304. Upon actuation, the position of top actuated sub-assembly 306, bottom actuated sub-assembly 334 and Hall bar elements 326, 328 is changed, and with it changes the intensity and direction of the magnetic field sensed. We mark with $V_{HB-326}$ and $V_{HB-328}$ the Hall output voltage of both sensors, which is proportional to the magnetic field sensed by each Hall sensor, as known in the art. Thus, the amount of rotation of top actuated sub-assembly 306 and bottom actuated sub-assembly 334 can be determined. In an example, the sum $V_{HB-326}+V_{HB-328}$ is proportional to the amount of tilt around the first rotation axis and the difference $V_{HB-326}-V_{HB-328}$ is proportional to the amount of tilt around the second rotation axis. A control circuit is used to control the position of the actuated sub-assembly and to set it to the position required by optical demands. The control circuit input includes signals of Hall bar elements 326, 328 and the output includes the amount of current applied in coils 322, 324. The control circuit may be implemented in an integrated circuit (IC). In some cases, the IC may be combined with one of Hall elements 326, 328. In other cases, the IC is a separate chip, which can be located outside of the camera (not shown).

Figure 4:
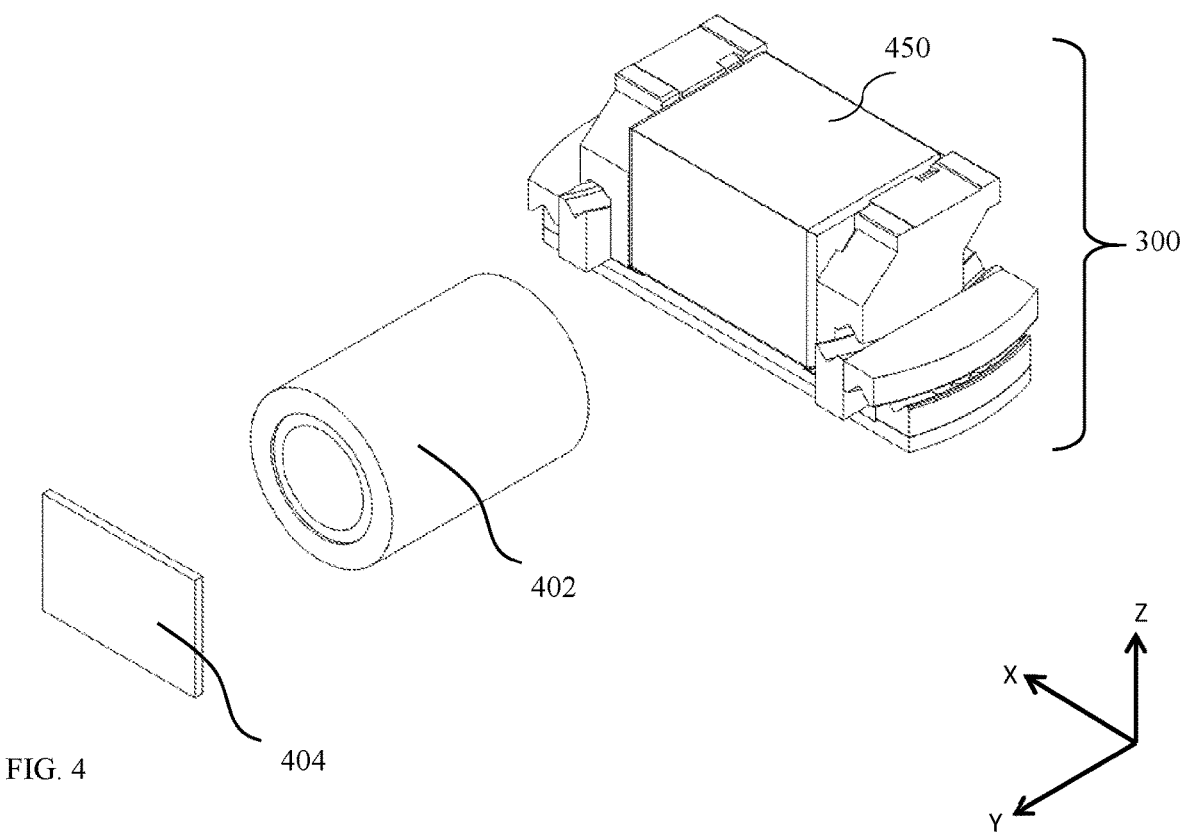
FIG. 4 shows the actuator of FIGS. 3A-3C, coupled to a folded camera.

FIG. 4 shows actuator 300 as part of a folded camera 400. In folded camera 400, actuator 300 serves for example to rotate an optical path folding element (OPFE) to create optical image stabilization in two directions, as described for example in U.S. provisional patent application 62/215,007. Folded camera 400 further includes a lens element 402 and an image sensor 404. A typical actuation stroke in this case may be in the range of ±0.5 to ±2 degrees around the X axis and ±1 to ±3 degrees around the Z axis of the original position of the light-folding element (e.g. prism 450) for both rotation directions. Folded camera 400 may further include an actuation mechanism (not shown) for lens element 402 as known in the art (for example described in PCT/IM2016/052179) for AF and/or OIS. The actuation mechanism of lens 402 is not dependent on the actuation done in actuator 300.

Figure 5A:
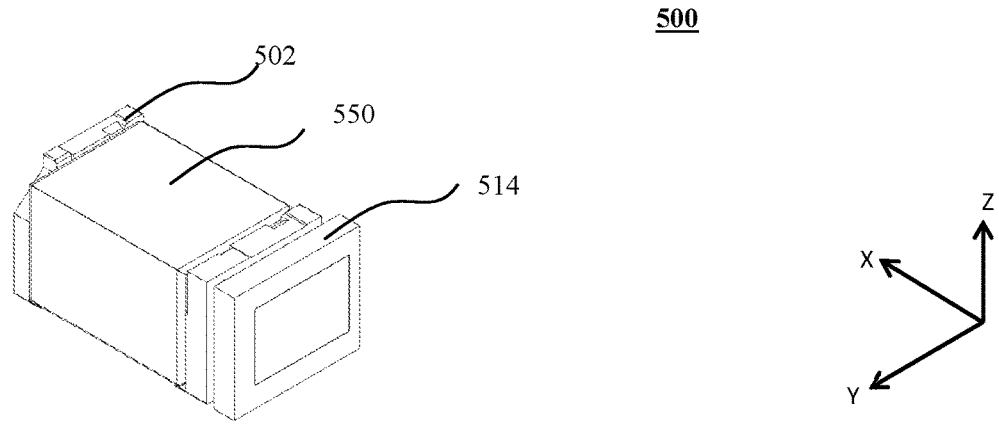
FIG. 5A shows yet another embodiment of a rotational ball-guided VCM actuator disclosed herein in an isomeric view.
Figure 5B:
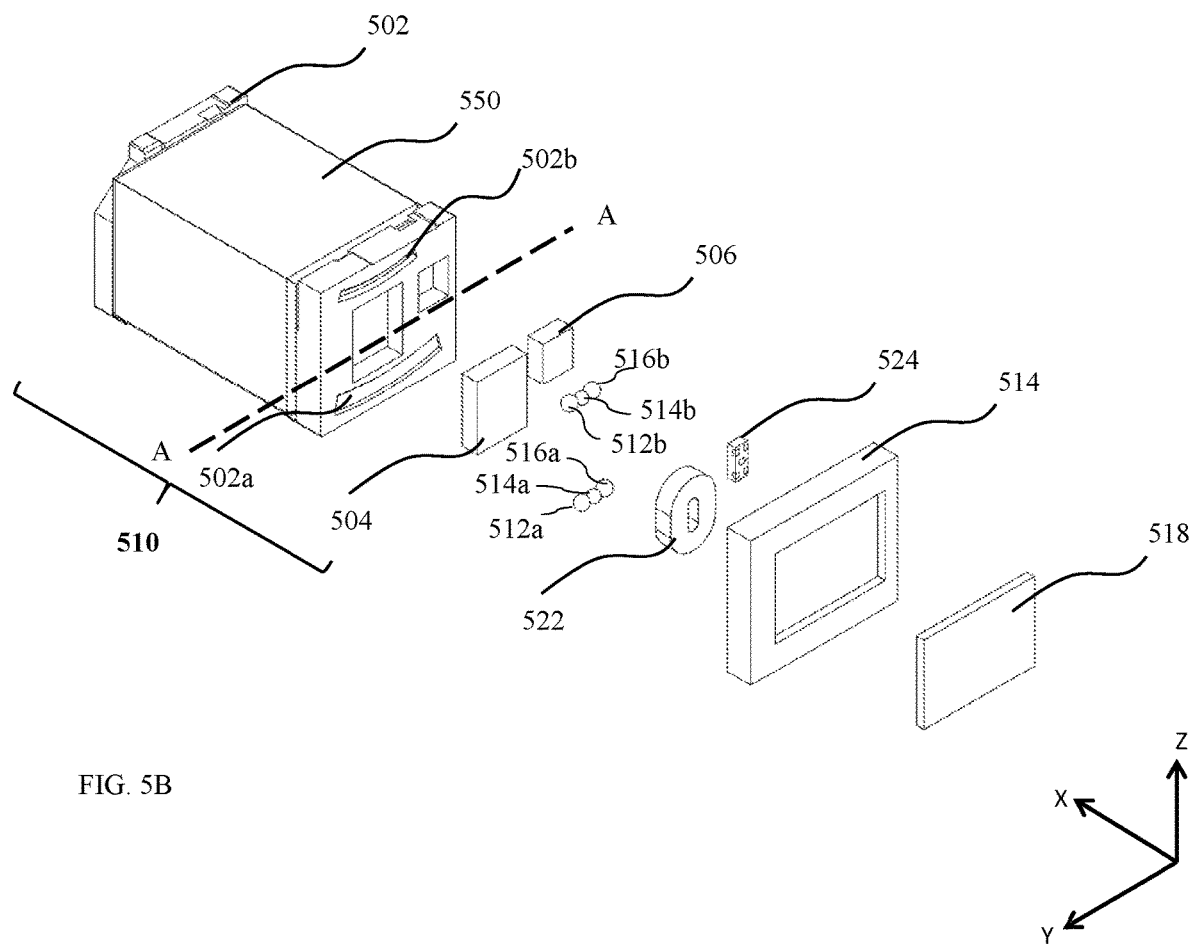
FIG. 5B shows the VCM actuator of FIG. 2A in an exploded view from one side.
Figure 5C:
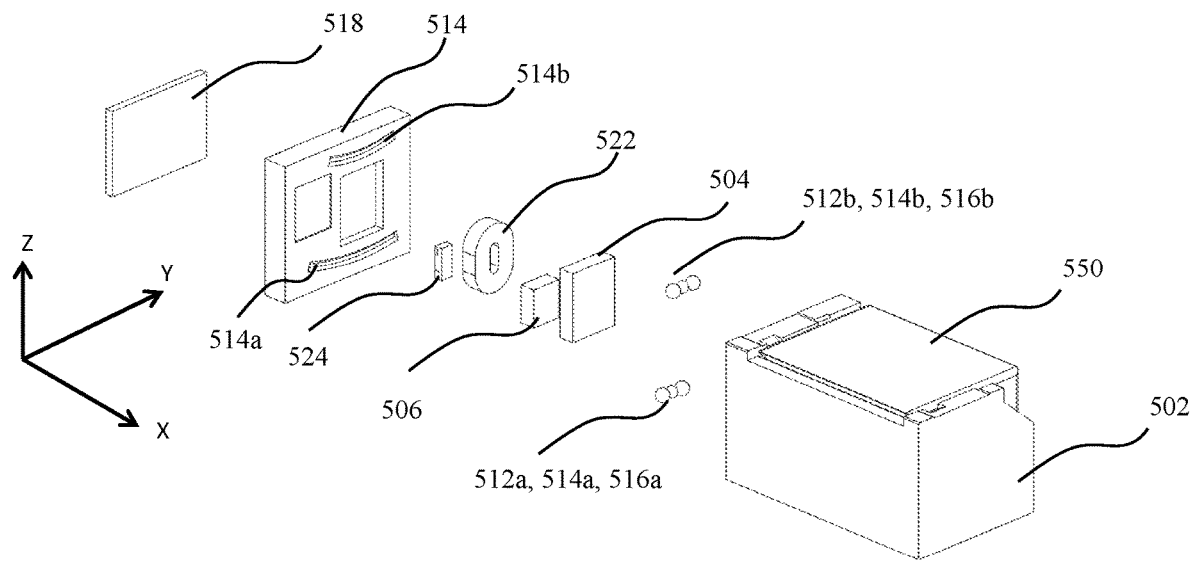
FIG. 5C shows the VCM actuator of FIG. 2A in an exploded view from another side.
Figure 5D:
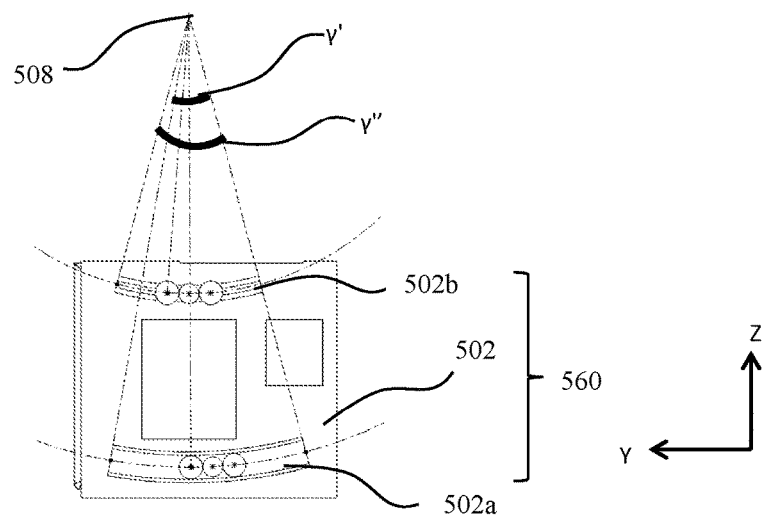
FIG. 5D shows a cross section of the VCM actuator along a line A-A marked in FIG. 5A.

FIGS. 5A-5D show schematically various views and components of another exemplary embodiment of a VCM actuator disclosed herein and numbered 500. FIG. 5A shows an isometric view of an assembled actuator 500, while FIGS. 5B, 5C show an exploded view of actuator 500 from two opposite directions along the X-axis. FIG. 5D shows a cross section of actuator 500 along a line A-A marked in FIG. 5A. Actuator 500 allows the rotation of an OPFE 550 around a single axis (i.e. around the X-axis) as described below. In FIGS. 5A-5D, OPFE 550 is a prism while in other embodiments it may a mirror or another type of optical path bending element.

In actuator 500, OPFE 550 is held in an OPFE holder 502, which can be made, for example by plastic mold, fitting the shape of OPFE 550. An actuation magnet 504 and a sensing magnet 506 are fixedly attached (e.g. glued) to optical element holder 502 from the side, in the same direction as an axis of rotation of OPFE 550 (the negative X direction in the figures). The assembly of OPFE 550, optical element holder 502 and magnets 504, 506 is referred to as "actuated sub-assembly" 510, shown from the side in FIG. 5D. Optical element holder 502 is molded with two arc-shaped grooves, 502a and 502b. Arcs 502a and 502b are concentric with each other, having a common center of rotation on an axis 508. Arc-shaped grooves 502a and 502b have respective angles γ' and γ'' fulfilling γ'>γ and γ''>γ, where angle γ is the required rotational stroke, as defined by optical needs. The center of rotation axis 508 and angles γ', γ'' are seen in FIG. 5D. The typical values for γ, γ' and γ'' are similar to those for α, α' and α''.

Actuator 500 further includes a sidewall 514. Sidewall 514 is a stationary part and is fixed rigidly to the actuator frame (not shown) and to the camera image sensor. Sidewall 514 is typically made of plastic. In some embodiments, sidewall 514 may be a part of the entire actuator's frame (known in the art as 'base'). Sidewall 514 may be molded as a single piece of plastic which serves for the purposes described below, as well as other purposes needed for the camera which actuator 500 is part of (e.g. holding the lens or holding the image sensor). Sidewall 514 is also molded with two arc-shaped grooves 514*a* and 514*b*. Actuated sub-assembly 510 is positioned alongside sidewall 514 such that grooves 514*a* and 514*b* are parallel to grooves 502*a* and 502*b* respectively. In this embodiment grooves 502*b*, 514*a* and 514*b* have V-groove shape, while groove 502*a* has a trapezoid shape; the considerations for these shapes was given above in the description of actuator 100.

Three balls 512*a*, 514*a* and 516*a* are positioned between grooves 502*a* and 514*a*, and, similarly, three balls 512*b*, 514*b* and 516*b* are positioned between grooves 502*b* and 514*b*. In other embodiments, actuator 500 may have more or less than 3 balls in each groove, typically in the range of 2-7 balls. Consideration for size and materials of all balls is similar to the described in actuator 100. The two pairs of grooves and their associated balls form a curved ball-guided mechanism 560 of actuator 500.

A metallic ferromagnetic yoke 518 is fixedly attached (e.g. glued) to sidewall 514 from a side opposite to those of magnets 504, 506 such that it faces magnet 504. Yoke 518 pulls magnet 504 (and thus pulls the actuated sub-assembly 510) by magnetic force and thus holds the curved ball-guided mechanism from coming apart. The magnetic force is in direction marked in FIG. 5A as the negative X direction. Balls 512*a*, 514*a* and 516*a* and 512*b*, 514*b* and 516*b* prevent actuated sub-assembly 510 from touching sidewall 514. Actuated sub-assembly 510 is thus confined along the X-axis and does not move in positive or negative X directions. Curved ball-guided mechanism 560 further confines the actuated sub-assembly 510 along other directions such that actuated sub-assembly can only move along the path defined by the parallel arcs 502*a*, 502*b*, 514*a* and 514*b*

Figure 5E:
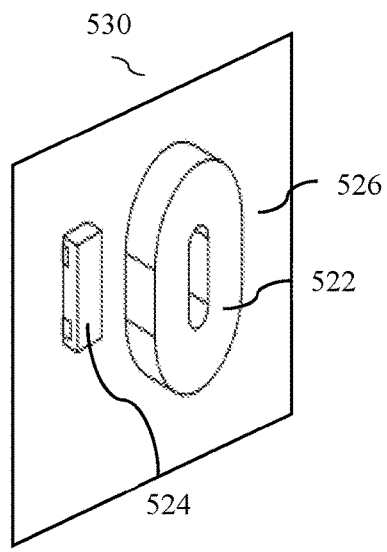
FIG. 5E shows details of an electro-magnetic sub-assembly in the VCM actuator of FIG. 5A.

Actuator 500 further includes an electro-magnetic sub-assembly 530, shown in FIG. 5E. Electro-magnetic sub-assembly 530 includes a coil 522, a Hall bar element 524 and a PCB 526. Coil 522 and Hall bar element 524 are soldered (each one by its own) to the PCB. Coil 522 has a stadium shape, typically has few tens of winding (not limiting range of 50-250), with a typical resistance of 10-30 ohm. PCB 526 allows sending input and output currents to coil 522 and Hall bar element 524, currents carrying both power and electronic signals needed for operation. PCB 526 is connected electronically to the external camera with wires (not shown). Electro-magnetic sub-assembly 530 is positioned between the magnets 504, 506 and yoke 518 such that there is an air-gap of typically about 100-200 μm between the magnets and the electro-magnetic sub-assembly (the Hall bar element, coil and magnets do not touch each other). Upon driving a current in coil 522 a Lorentz force is created: a current in a clockwise direction will create force in the positive Y direction while a current in counter clockwise direction will create a force in the negative Y direction. The full magnetic scheme (e.g. the fixed magnet 504 pole direction) is known in the art, and described for example in detail in co-owned patent PCT/IB2016/052179.

As for actuated sub-assemblies above, while the magnetic force applied by the electro-magnetic sub-assembly is in the positive and negative Y directions, the rail created by the balls and grooves create a confinement for actuated sub-assembly 510 to move along an arc parallel to grooves 502*a*, 502*b*, 514*a* and 110*b*. Hall bar element 524 can sense the intensity and direction of the magnetic field of sensing magnet 506. Upon actuation, the relative position of actuated sub-assembly 510 and Hall bar element 524 is changed. The intensity and direction of the magnetic field senses by Hall bar element 524 changes as well and thus the position of actuated sub-assembly 510 can be determined.

A control circuit is used to control the position of the actuated sub-assembly and set to the position required by optical demands. The control circuit input is a signal from Hall bar element 524 and the output is the amount of current applied in coil 522. The control circuit may be implemented in an IC. In some cases, the IC may be combined with Hall element 524. In other cases, it is a separate chip, which can be located outside of the camera (not shown).

In some embodiments, the sensing magnet 506 can be removed and the Hall bar element 524 can be placed in the center of the coil so the actuation magnet 504 can be used for both actuation and sensing (as described for example above with reference to FIG. 1E).

In some embodiments, sensing magnet 506 and actuation magnet 504 may be combined into one magnet with the suitable magnetization to allow the sensing and actuating functionality described above.

Figure 6:
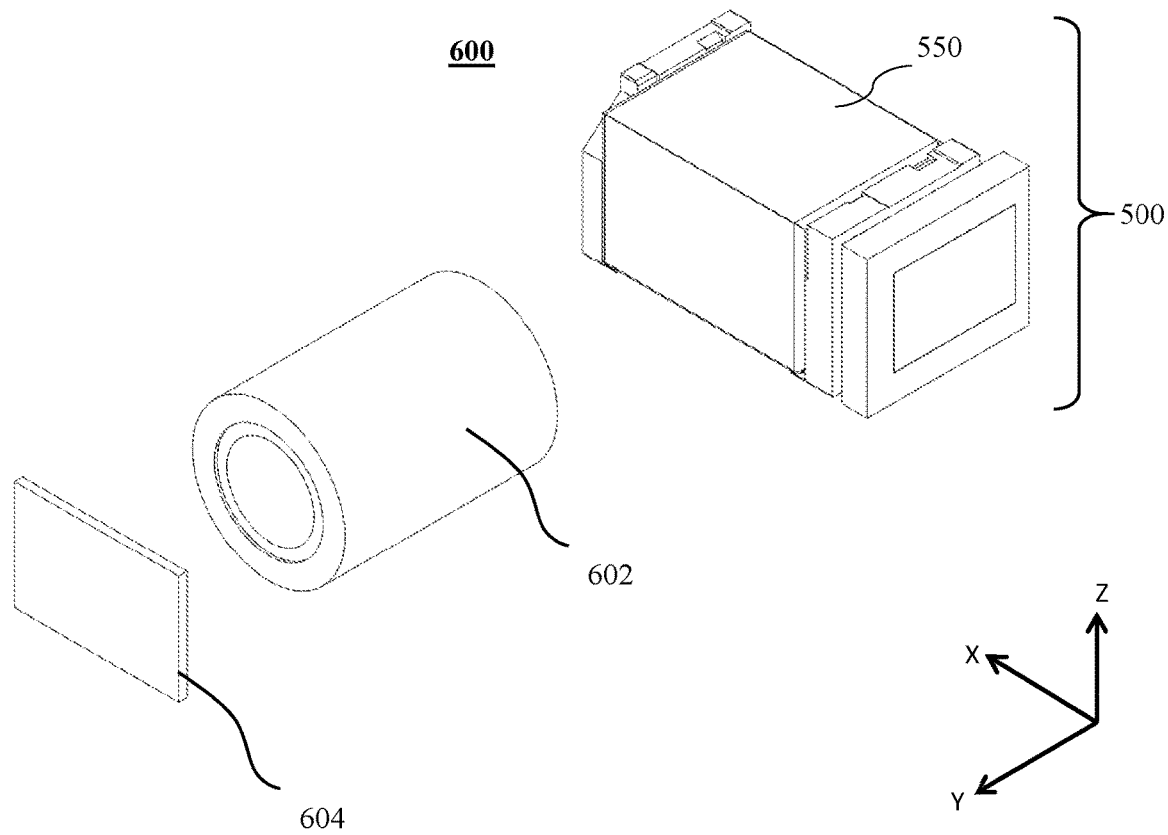
FIG. 6 shows the actuator of FIGS. 5A-5E, coupled to a folded camera.

FIG. 6 shows actuator 500 as part of a folded camera 600. In camera 600, actuator 500 serves as an example of usage to rotate a light folding element, for example prism 550. Actuation by actuator 500 in camera 600 can be used, for example, to create OIS as described in PCT/M2016/052179. Camera 600 further includes a lens element 602 and an image sensor 604. A typical actuation stroke γ in this case should be in the range of ±0.5 to ±2 degrees of the original position of prism 550. As described with reference to camera 200 above, camera 600 may further include actuation mechanisms to actuate lens element 602 for AF and/or OIS (not shown).

Any of the actuators disclosed above may be included in a folded camera which in turn may be included together with an upright (non-folded) camera in a dual-aperture camera with folded lens, for example as described in co-owned U.S. Pat. No. 9,392,188.

While this disclosure describes a limited number of embodiments, it will be appreciated that many variations, modifications and other applications of such embodiments may be made. In general, the disclosure is to be understood as not limited by the specific embodiments described herein, but only by the scope of the appended claims.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present application.

What is claimed is:
1. An actuator for rotating or tilting an optical path folding element (OPFE) that folds light from a first optical axis to a second optical axis, comprising:
   a first voice coil motor (VCM);
   a first curved ball-guided mechanism operative to create a rotation or tilt movement of the OPFE around a first rotation axis upon actuation by the VCM;
   a second VCM; and a second curved ball-guided mechanism operative to create a rotation or tilt movement of the OPFE around a second rotation axis upon actuation by the second VCM, wherein the first rotation axis and the second rotation axis are not parallel.

2. The actuator of claim 1, wherein the first VCM includes a coil mechanically coupled to a static base and a fixed magnet mechanically coupled to a holder for holding the OPFE, and wherein the rotation or tilt movement is created by a current passing through the coil.

3. The actuator of claim 1, wherein the first ball-guided mechanism includes a pair of grooves having a plurality of balls located therebetween, wherein at least one of the grooves in the pair has a curvature defined by a radius that starts at a center of curvature which lies on the first rotation axis.

4. The actuator of claim 1, wherein the first rotation axis includes an axis perpendicular to both the first optical axis and the second optical axis.

5. The actuator of claim 1, wherein the first rotation axis includes an axis combining the second optical axis and an axis perpendicular to both the first optical axis and the second optical axis.

6. The actuator of claim 1, wherein the first curved ball-guided mechanism is positioned below the OPFE.

7. The actuator of claim 1, wherein the first rotation axis and the second rotation axis are substantially orthogonal to each other.

8. The actuator of claim 2, wherein the first VCM includes a first coil mechanically coupled to a static base and a first magnet mechanically coupled to a holder for holding the OPFE, wherein the second VCM includes a second coil mechanically coupled to a static base and a second magnet mechanically coupled to a holder for holding the OPFE, and wherein the first rotation or tilt movement and the second rotation or tilt movement are created by a combination of currents passing through the first coil and the second coil.

9. The actuator of claim 2, wherein the fixed magnet and the coil are positioned below the OPFE.

10. The actuator of claim 2, wherein the fixed magnet and the coil are positioned on a side of the OPFE in a plane parallel to a plane that includes both the first axis and the second optical axis.

11. The actuator of claim 2, further comprising a ferromagnetic yoke attached to the static base and used to pull the fixed magnet in order to prevent the first curved ball-guided mechanism from coming apart.

12. The actuator of claim 2, further comprising a ferromagnetic yoke attached to the static base and used to pull the fixed magnet in order to prevent the first curved ball-guided mechanism and the second curved ball-guided mechanism from coming apart.

13. The actuator of claim 2, further comprising a position sensor for measuring an angle of the OPFE relative to the static base.

14. The actuator of claim 3, wherein the center of curvature resides inside the OPFE.

15. The actuator of claim 3, wherein the center of curvature resides outside the OPFE.

16. The actuator of claim 8, wherein the first and second magnets are unified as a single magnet.

17. The actuator of claim 13, wherein the position sensor is a Hall bar position sensor operative to measure the magnetic field of the fixed magnet.

18. A camera comprising an actuator according to claim 1.

19. A camera comprising an actuator according to claim 2.

20. A camera comprising an actuator according to claim 3.

* * * * *